US008821737B2

(12) United States Patent
Jiromaru et al.

(10) Patent No.: US 8,821,737 B2
(45) Date of Patent: Sep. 2, 2014

(54) SUBSTRATE PROCESSING METHOD

(75) Inventors: Tomohiro Jiromaru, Chino (JP); Junichi Takeuchi, Chino (JP)

(73) Assignee: Seiko Epson Corporation (JP)

( * ) Notice: Subject to any disclaimer, the term of this patent is extended or adjusted under 35 U.S.C. 154(b) by 242 days.

(21) Appl. No.: 13/357,893

(22) Filed: Jan. 25, 2012

(65) Prior Publication Data

US 2012/0187084 A1 Jul. 26, 2012

(30) Foreign Application Priority Data

Jan. 26, 2011 (JP) ................................ 2011-013751

(51) Int. Cl.
*C03C 15/00* (2006.01)
*B44C 1/22* (2006.01)

(52) U.S. Cl.
USPC ............................................. 216/36; 216/38

(58) Field of Classification Search
USPC .................................................... 216/36, 38
See application file for complete search history.

(56) References Cited

U.S. PATENT DOCUMENTS

2005/0282374 A1* 12/2005 Hwang et al. ................ 438/613
2007/0057410 A1* 3/2007 Chan et al. .................... 264/482
2007/0200877 A1 8/2007 Arakawa
2008/0090085 A1* 4/2008 Kawate et al. ................ 428/413
2010/0093155 A1* 4/2010 Matsumura et al. .......... 438/464
2010/0253743 A1 10/2010 Takeuchi

FOREIGN PATENT DOCUMENTS

JP 2005-231274 9/2005
JP 2007-168344 7/2007
JP 4321574 6/2009
JP 2010-186971 8/2010
JP 2010-240852 10/2010

* cited by examiner

*Primary Examiner* — Shamim Ahmed
(74) *Attorney, Agent, or Firm* — Harness, Dickey & Pierce, P.L.C.

(57) ABSTRACT

A processing method of a substrate which includes: a first bonding step which bonds a ring-shaped first support member to a first surface of the substrate along the outer periphery of the substrate; a first processing step which processes the substrate; and a first separating step which separates the first support member from the substrate by separation at the bonded position.

7 Claims, 5 Drawing Sheets

SUBSTRATE PROCESSING METHOD

BACKGROUND

1. Technical Field

The present invention relates to a method for processing a substrate, and more particularly to a method for supporting a substrate.

2. Related Art

A method of manufacturing various types of parts from a silicon substrate (called a "wafer" as well) by fine processing of the substrate has been widely used. In processing a wafer, a load is applied to the wafer depending on the type of processing. For protection of the wafer from damages, a plate-shaped reinforcing member is bonded to the wafer for reinforcement in some cases.

JP-A-2010-186971 discloses a method which separates a wafer into pieces by dicing. According to this method, the wafer is initially ground to form a ring-shaped reinforcing portion on the outer periphery thereof. Elements are subsequently formed on the surface of the wafer opposite to the surface where the reinforcing portion is produced. Then, the wafer is cut by a cutting blade to be divided into individual devices. Finally, after the wafer is turned over, the ring-shaped reinforcing portion is cut by the cutting blade to be separated and removed from the wafer.

According to the method in the related art, the ring-shaped reinforcing portion is formed to allow processing on both surfaces of the wafer. This reinforcing portion is cut and removed in the dicing process. However, the work for cutting the outer periphery of the wafer in a circular shape requires time. Therefore, such a substrate processing method which can form a surface for supporting the substrate as well with high productivity has been demanded.

SUMMARY

An advantage of some aspects of the invention is to solve at least a part of the aforementioned problems and the invention can be implemented as the following forms or application examples.

APPLICATION EXAMPLE 1

This application example of the invention is directed to a processing method of a substrate including: a first bonding step which bonds a ring-shaped first support member to a first surface of the substrate along the outer periphery of the substrate; a first processing step which processes the substrate; and a first separating step which separates the first support member from the substrate by separation at the bonded position.

According to this application example of the invention, the ring-shaped first support member is bonded to the substrate in the first bonding step. In this condition, the substrate surface is exposed. The exposed surface of the substrate is processed in the first processing step. The first support member is removed from the substrate in the first separating step so that the processed substrate can be separated. According to this method, the surface to which the first support member is bonded is exposed in the first processing step. Thus, the surface for supporting the substrate can be simultaneously processed. The first support member bonded to the substrate is separated from the substrate by separation at the bonded position in the first separating step. Accordingly, the first support member can be separated from the substrate with higher productivity than in the method which removes the first support member by cutting the substrate.

APPLICATION EXAMPLE 2

It is preferable that the first support member of the processing method of the substrate according to the above aspect has light transmissibility, and is bonded to the substrate via an adhesive or an adhesive tape releasable by irradiation of UV light or releasable by heating in the first bonding step.

According to this application example of the invention, the adhesion of the adhesive or the adhesive tape is decreased by irradiation of UV light in the releasing step when the adhesive or the adhesive tape releasable by irradiation of UV light is used. On the other hand, the adhesion of the adhesive or the adhesive tape is decreased by heating in the releasing step when the adhesive or the adhesive tape releasable by heating is used. Accordingly, the first support member can be separated with no damage given to the substrate.

APPLICATION EXAMPLE 3

It is preferable that the processing method of the substrate according to the above aspects further includes: a second bonding step which bonds a second support member to the substrate such that the second support member can cover the first surface of the substrate; a second processing step which processes the substrate; and a second separating step which separates the second support member from the substrate.

According this application example of the invention, the second support member is so bonded as to cover the first surface of the substrate in the second bonding step. The substrate is processed in the second processing step. The second support member is separated from the substrate in the second separating step. Thus, the substrate after processing is separated from the second support member. In the second processing step, the second support member covering the first surface of the substrate can receive a load applied to the substrate without deforming the substrate. Since the second support member is bonded to the first surface, the chance of adherence of a contaminant such as an adhesive to the surface opposite to the first surface is low. Accordingly, an additional step of cleaning the surface opposite to the first surface can be eliminated.

APPLICATION EXAMPLE 4

It is preferable that the adhesive and the adhesive tape of the processing method of the substrate according to the above aspects have heat resistance. In this case, the adhesive and the adhesive tape releasable by heating have heat resistance up to a releasable temperature.

According to this application example of the invention, the adhesive or the adhesive tape having heat resistance is used for the bonding between the substrate and the first support member. Thus, the processing in the first processing step can be executed at a high temperature. When the adhesive or the adhesive tape releasable by heating is used, the endurable temperature is set at a temperature lower than the releasable temperature.

APPLICATION EXAMPLE 5

It is preferable that the first processing step of the processing method of the substrate according to the above aspects includes a step for simultaneously processing both the first surface and a second surface as the rear side of the first surface.

According to this application example of the invention, the ring-shaped first support member is bonded to the substrate. In this case, both the surfaces of the substrate are exposed, wherefore the processing can be performed for both the exposed surfaces of the substrate in the first processing step. Accordingly, the productivity of the processing simultaneously performed for both the surfaces becomes higher than the productivity of the processing performed initially for the one surface and subsequently performed for the other surface after the substrate is turned over.

APPLICATION EXAMPLE 6

It is preferable that the first separating step of the processing method of the substrate according to the above aspects shifts the first support member in the direction perpendicular to the substrate after irradiation of UV light or after heating to separate the first support member from the substrate.

According to this application example of the invention, the adhesion of the adhesive or the adhesive tape is decreased by irradiation of UV light or heating for separation between the bonded substrate and the first support member. Then, the first support member is shifted in the direction perpendicular to the substrate to be separated therefrom. According to this method, no scratch is produced between the substrate and the first support member at the time of separation. Thus, the first support member can be separated from the substrate with no damage given to the substrate.

BRIEF DESCRIPTION OF THE DRAWINGS

The invention will be described with reference to the accompanying drawings, wherein like numbers reference like elements.

DESCRIPTION OF EXEMPLARY EMBODIMENT

A method of manufacturing a nozzle plate according to an embodiment of the invention is hereinafter described with reference to the drawings. The nozzle plate is a substrate which has an arrangement of small holes as nozzles equipped on ink jet heads. Since the nozzles deliver fine liquid drops, the surface of the nozzle plate requires water repellent finish or hydrophilic finish. In the figures referred to in the following description, the reduction scales of respective layers and parts are changed from the actual scales so that these layers and parts have sufficient sizes for visual recognition in the figures.

Embodiment

Figure 1:
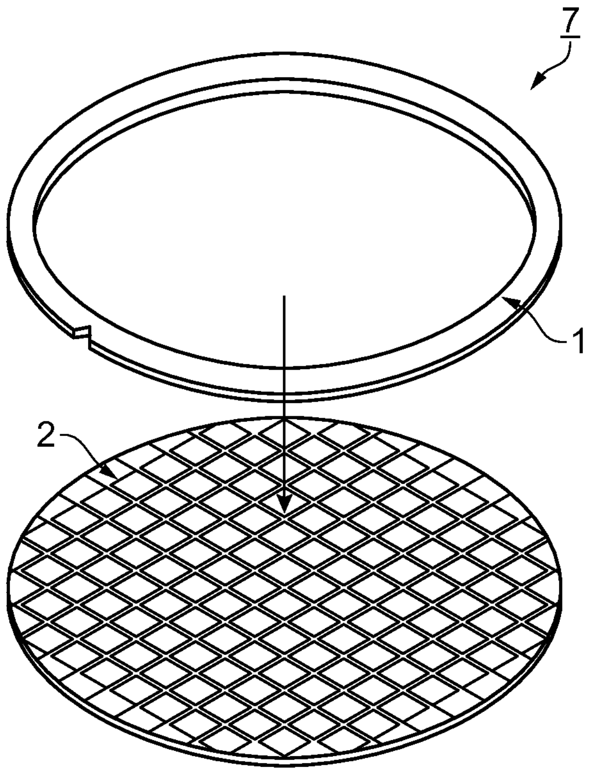
FIG. 1 is a perspective view schematically illustrating a substrate supported by a support member in a disassembled condition.
Figure 2:
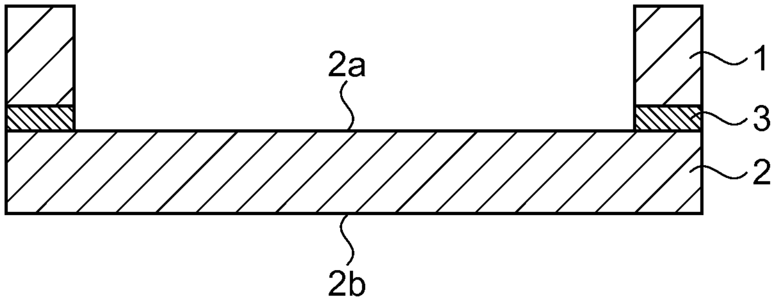
FIG. 2 is a vertical cross-sectional view schematically illustrating the substrate supported by the support member.

FIG. 1 is a perspective view schematically illustrating a substrate supported by a support member in a disassembled condition. FIG. 2 is a vertical cross-sectional view schematically illustrating the substrate supported by the support member. As illustrated in FIG. 1, a ring support system 7 includes a ring-shaped first support member 1 and a substrate 2 bonded to each other. Various processes are performed under the bonded condition of the first support member 1 and the substrate 2. The substrate 2 is sectioned into a plurality of grids. There is provided MEMS (micro electro mechanical systems), IC (integrated circuit), LSI (large scale integrated circuit), or other device on each of the sectioned areas.

The first support member 1 may be made of any materials as long as they have sufficient mechanical strength. For example, glass, plastic, and diamond may be used. The first support member 1 made of the selected material is formed into a ring shape.

As illustrated in FIG. 2, a bonding layer 3 is provided between the first support member 1 and the substrate 2. The first support member 1 is disposed on a first surface 2*a* of the substrate 2 with the bonding layer 3 interposed therebetween. The surface opposite to the first surface 2*a* is a second surface 2*b*. The bonding layer 3 is constituted by an adhesive or an adhesive tape whose adhesion lowers by irradiation of UV light. The adhesive tape as the material of the bonding layer 3 is a continuous ring-shaped tape. The width of the adhesive tape in the plan view of the first support member 1 is the same as the width of the first support member 1. The adhesive as the material of the bonding layer 3 is of UV hardening type or UV foaming type, for example.

Alternatively, the bonding layer 3 may be formed by an adhesive or an adhesive tape whose adhesion lowers by heating. The heating temperature individually determined for each adhesive and base varies for each layer and each material. It is thus preferable that the temperature is set based on the result of a preliminary experiment performed beforehand. It is further preferable that the adhesive and the adhesive tape have sufficient heat resistance for enduring heat up to the temperature of release of the adhesive and the adhesive tape releasable by heating. In this case, the processing can be performed at a high temperature up to the temperature of release.

The types of adhesive as the material of the bonding layer 3 include acrylic resin, α-olefin, urethane resin, ether, epoxy resin, vinyl chloride resin, chloroprene rubber, vinyl acetate resin emulsion, silicon, water based polymer isocyanate, styrene-butadiene rubber, nitrile rubber, cellulose nitrate, reactive hot melt, phenolate resin, modified silicon, polyimide, polyamide resin hot melt, polyurethane resin hot melt, polyolefin resin hot melt, polyvinyl acetate resin solution, polystyrene resin solvent, polyvinyl alcohol, polyvinyl pyrrolidone resin, polyvinyl butyral resin, polybenzimidazole, polymethyl methacrylate resin solution, melamine resin, urea resin, and resorcinol, for example. An adhesive tape made of these adhesives may be used. According to this embodiment, an acrylic resin adhesive or an acrylic resin adhesive tape is employed.

FIGS. 3A through 3C and FIG. 4 schematically illustrate manufacturing steps performed with the aid of the ring support system. Initially, the substrate 2 having a through hole 2*c* is prepared. The through hole 2*c* is formed by a known technique such as photolithography and etching (not explained herein). The through hole 2*c* corresponds to a nozzle to be formed.

In a second bonding step, an adhesive is applied to the first surface 2*a*, whereafter the substrate 2 and a second support member 4 are affixed to each other. Then, the substrate 2 and the second support member 4 bonded with each other are dried by heating at a predetermined temperature until the adhesive hardens. By this step, the second support member 4 is fixed to the first surface 2*a* via an adhesive layer 5. The second support member 4 having a size sufficient for covering the substrate 2 is disposed in such a position as to cover the entire area of the first surface 2*a* of the substrate 2. Up to this step, the second support member 4, the adhesive layer 5, and the substrate 2 are laminated on each other. In this condition, the entire area of the second surface 2*b* can be processed with the substrate-shaped second support member 4 affixed to the one surface of the substrate 2.

Affixation between the second support member 4 and the substrate 2 is achieved by the use of an adhesive or an adhesive tape whose adhesion lowers by irradiation of UV light. The adhesive or the adhesive tape is of UV hardening type or UV foaming type, for example. Alternatively, the adhesive layer is constituted by an adhesive or an adhesive tape whose adhesion lowers by heating at a high temperature. The heating temperature and heating method individually determined for each adhesive and base vary for each layer and each material. It is thus preferable that the processing conditions are established based on the result of a preliminary experiment performed beforehand.

In a second processing step, the substrate 2 is ground to a predetermined thickness. During this step, the substrate 2 to which the second support ember 4 is fixed is not easily damaged even when a load is applied to the substrate 2.

In a second separating step, the substrate 2 is separated from the second support member 4. When the second support member 4 is affixed to the substrate 2 via the adhesive or the adhesive tape whose adhesion lowers by UV light irradiation, the second support member 4 or the substrate 2 is made of light-transmissible material. For example, the second support member 4 or the substrate 2 may be made of glass, plastic, or diamond. After irradiation of UV light to the adhesive layer 5, the second support member 4 is separated from the substrate 2. In this case, the second support member 4 is shifted in the direction perpendicular to the substrate 2 for separation therefrom.

Figure 3A:
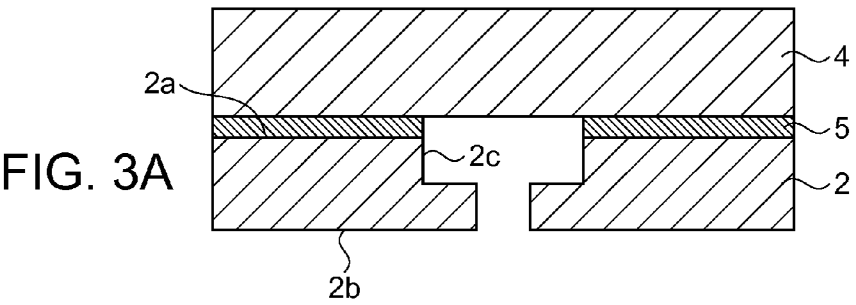
FIGS. 3A through 3C schematically illustrate manufacturing steps performed with the aid of a ring support system.
Figure 3B:
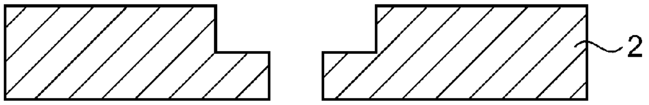
Figure 3C:
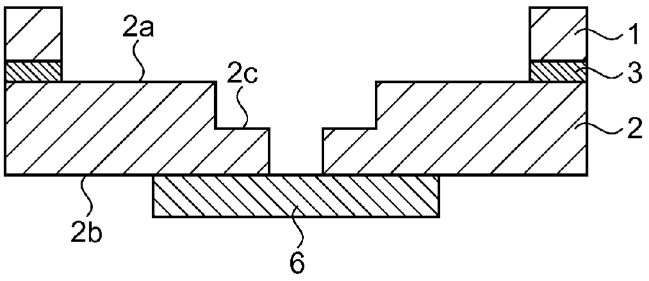

When the second support member 4 is affixed to the substrate 2 via the adhesive or the adhesive tape whose adhesion lowers by heating, the adhesive layer 5 is heated, whereafter the second support member 4 is separated from the substrate 2. In this case, the second support member 4 is shifted in the direction perpendicular to the substrate 2 for separation therefrom. By this step, the substrate 2 shown in FIG. 3B is produced.

In a first bonding step, an adhesive is applied to the ring-shaped first support member 1. Alternatively, an adhesive tape cut in a ring shape is affixed to the first support member 1. Then, the first support member 1 is affixed to the first surface 2*a* of the substrate 2. In this case, the first support member 1 can be attached to the substrate 2 with high positional accuracy when a jig having an alignment pin or a set of a camera and an image processing device is used for alignment. The ring-shaped first support member 1 is bonded to the first surface 2*a* along the outer periphery of the substrate 2.

In a first processing step, various surface treatments are performed for the substrate 2. Since only the outer periphery of the first surface 2*a* is covered by the first support member 1, the surface treatments can be simultaneously executed for both the first surface 2*a* and the second surface 2*b*.

Initially, the substrate 2 is soaked in an etchant which smoothens the surface of the substrate 2. In this case, the etching treatment is simultaneously performed for the first surface 2*a* and the second surface 2*b*. Then, the substrate 2 is soaked in a chemical which forms a repellant film. Similarly to the above treatment, this surface treatment is simultaneously performed for the first surface 2*a* and the second surface 2*b*. The applied chemical is dried to form a repellant film.

Then, a protection tape 6 is affixed to the second surface 2*b* in the vicinity of the through hole 2*c*. The protection tape 6 thus attached protects the substrate 2. The protection tape 6 covering a part of the exposed substrate 2 protects only the covering area of the substrate 2.

Plasma treatment is executed as a surface treatment of the substrate 2. The area of the substrate 2 covered by the protection tape 6 is not subject to plasma treatment and retained as a portion having the repellant film. Similarly to the above treatments, the plasma treatment is simultaneously performed for the first surface 2*a* and the second surface 2*b*. Then, the substrate 2 is cleaned. Similarly to the above treatments, the cleaning is simultaneously executed for the first surface 2*a* and the second surface 2*b*.

Figure 4:
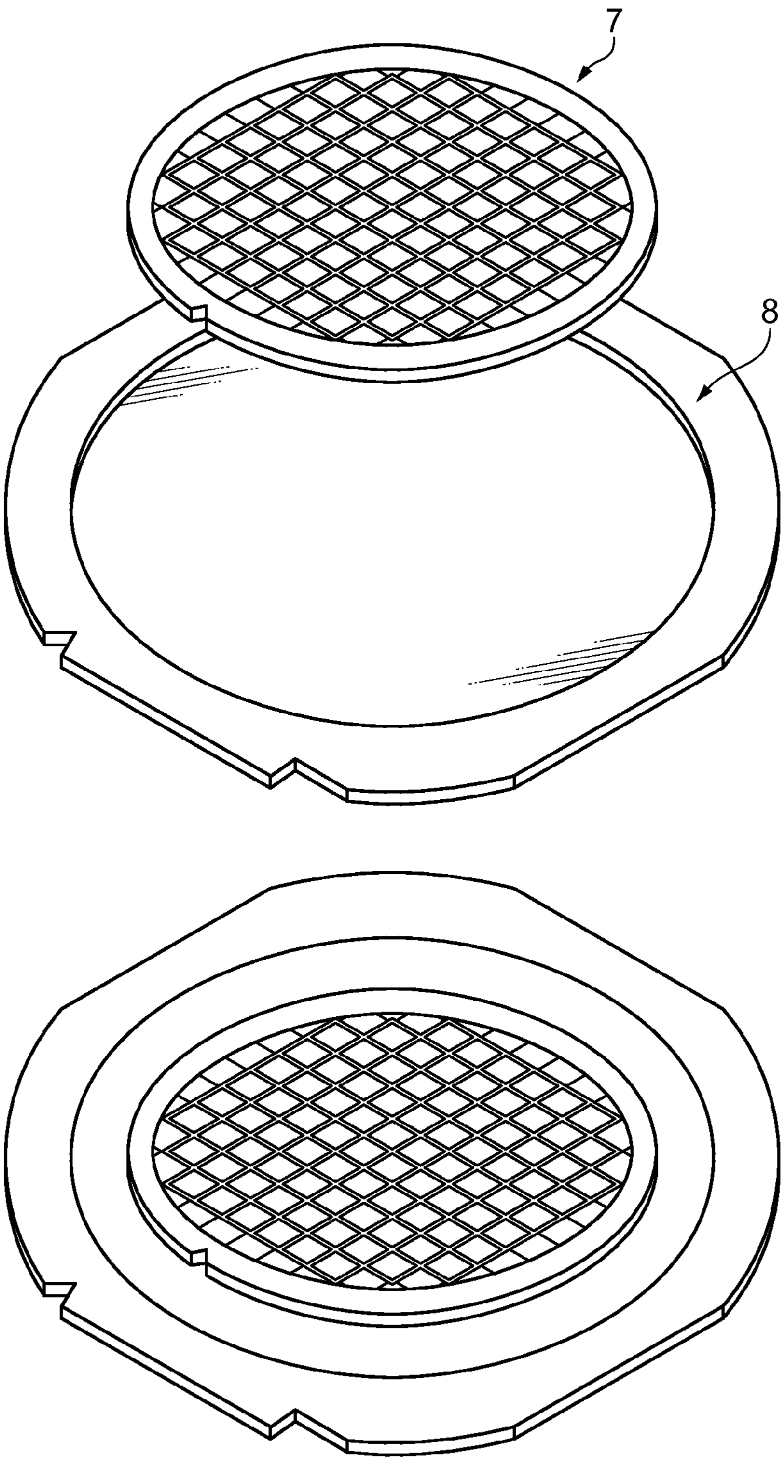
FIG. 4 schematically illustrates a manufacturing step performed with the aid of the ring support system.

In a first separating step, the first support member 1 is separated from the substrate 2. In this case, the ring support system 7 as one piece component of the first support member 1 and the substrate 2 is affixed to a dicing tape 8 as illustrated in FIG. 4. Then, a treatment for weakening the adhesion of the bonding layer 3 is carried out.

When the bonding layer 3 is constituted by an adhesive or an adhesive tape whose adhesion lowers by UV light irradiation, UV light is applied to the bonding layer 3, whereafter the first support member 1 is separated from the substrate 2.

When the bonding layer 3 is constituted by an adhesive or an adhesive tape whose adhesion lowers by heating, the bonding layer 3 is heated, whereafter the first support member 1 is separated from the substrate 2.

For separation between the first support member 1 and the substrate 2, the first support member 1 is shifted in the direction perpendicular to the substrate 2 so as to avoid scratch between the substrate 2 and the first support member 1.

Then, an external stimulation is given to the dicing tape 8 to lower the adhesion of the diving tape 8, whereafter the substrate 2 is diced. For dicing, methods such as cutting by laser beams and cutting by a high-speed rotational diamond blade may be employed, for example.

The external stimulation is given by a method appropriate for the type of the dicing tape 8, such as UV light irradiation and heating. When the dicing tape 8 is formed by an ultraviolet ray hardening type tape such as "UC series" (product name) manufactured by Furukawa Electric Co., Ltd., for example, the adhesion of the tape is decreased by ultraviolet ray irradiation. On the other hand, when the diving tape 8 is formed by a tape whose adhesion lowers by heating such as "REVALPHA" (product name) manufactured by Nitto Denko Corporation, the adhesion of the tape is decreased by heating.

Then, the discrete chips divided by dicing are released from the dicing tape 8 to be completed as a nozzle plate.

According to the ring support system in this embodiment, the following advantages can be offered.

(1) According to this embodiment, the first surface 2*a* is exposed under the condition in which the ring-shaped first support member 1 is affixed to the substrate 2. In this case, the exposed first surface 2*a* can be easily processed. Moreover, the first support member 1 is separated from the substrate 2 by removal of the bonding layer 3 whose adhesion has been weakened in the first separating step. Thus, the first support member 1 can be separated from the substrate 2 with higher productivity than in the method which removes the first support member 1 from the substrate 2 by cutting.

(2) According to this embodiment, the processing is simultaneously performed for both the surfaces of the substrate 2 with the first support member 1 affixed thereto. Thus, the number of the steps for the processing becomes smaller than that number in a method which carries out processing for each of the surfaces separately.

(3) According to this embodiment, the processing in the second processing step is performed with the second support member 4 affixed to the first surface 2*a* of the substrate 2. Similarly, the processing in the first processing step is performed with the first support member 1 affixed to the first surface 2*a* of the substrate 2. In this case, the chance of adherence of a contaminant such as an adhesive to the second surface 2*b* lowers, which can eliminate an additional step for removing the contaminant.

(4) According to this embodiment, the adhesive or the adhesive tape for the bonding between the first support member 1 and the substrate 2 is constituted by an adhesive or an adhesive tape whose adhesion lowers by UV light irradiation. Moreover, the first support member 1 is made of light-transmissible material. Thus, the adhesion does not decrease prior to irradiation of UV light, which allows processing of the substrate 2 under the condition in which the first support member 1 is attached thereto. After irradiation of UV ray, the first support member 1 can be separated from the substrate 2 with no damage given to the substrate 2.

According to the description of this embodiment, it has been mentioned that the adhesive or the adhesive tape between the first support member 1 and the substrate 2 may be made of material whose adhesion lowers by heating. In this structure, the adhesion does not decrease before heating, wherefore the substrate 2 can be processed under the condition in which the first support member 1 is attached thereto. After heating, the first support member 1 can be separated from the substrate 2 with no damage given to the substrate 2.

(5) According to this embodiment, the first support member 1 is shifted in the direction perpendicular to the substrate 2 to be separated therefrom. In this case, no scratch is produced between the substrate 2 and the first support member 1 at the time of separation. Thus, the first support member 1 can be separated from the substrate 2 with no damage given to the substrate 2.

(6) According to this embodiment, the adhesive or the adhesive tape having heat resistance is used for the bonding between the substrate 2 and the first support member 1. Therefore, the first processing step can be executed at a high temperature. When an adhesive or an adhesive tape releasable by heating is used, the endurable temperature is set at a temperature lower than the releasable temperature.

The invention is not limited to the embodiment described herein but may be practiced otherwise. Various modifications, improvements and the like including the following modified examples may be made.

Several methods for processing a substrate according to modified examples are hereinafter described with reference to the drawings. The parts and components in the modified examples corresponding to the parts and components in the embodiment have been given similar reference numbers, and the same explanation is not repeated.

Modified Example 1

Figure 5:
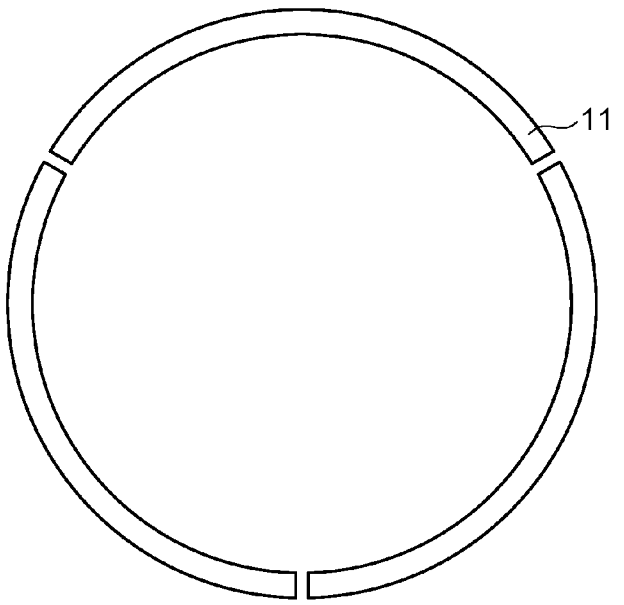
FIG. 5 is a plan view schematically illustrating the shape of an adhesive tape according to a modified example.

According to the embodiment, the adhesive tape has a continuous ring shape. However, the adhesive tape may be constituted by divided tapes. Explained below are the details of the shapes of the divided tapes used for affixation of the ring-shaped first support member. FIG. 5 is a plan view schematically illustrating the shapes of the adhesive tapes in this example.

As illustrated in FIG. 5, an adhesive tape 11 is a ring-shaped component divided at three points. The divided shape of the adhesive tape 11 produces clearances between the first support member 1 and the substrate 2 at the divided points. In this case, the adhering area between the first support member 1 and the substrate 2 decreases, which facilitates separation between the first support member 1 and the substrate 2. The number of division of the adhesive tape 11 may be two, or four or more.

Modified Example 2

Figure 6:
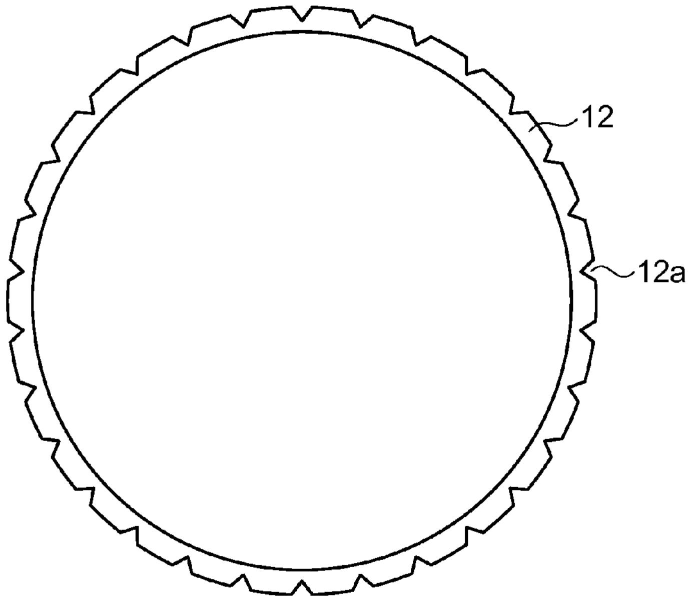
FIG. 6 is a plan view schematically illustrating the shape of an adhesive tape according to another modified example.

According to the embodiment, the adhesive tape has a continuous ring shape. However, the adhesive tape may be a tape having cutouts on the outer periphery thereof. Explained below are the details of the shape of this adhesive tape used for affixation of the first support member 1. FIG. 6 is a plan view schematically illustrating the shape of the adhesive tape in this example.

As illustrated in FIG. 6, cutouts 12*a* are formed on the outer periphery of a ring-shaped adhesive tape 12. These cutouts 12*a* allow easy separation between the first support member 1 and the substrate 2 by removal of the first support member 1 at the cutouts 12*a* in the first separating step.

Modified Example 3

Figure 7:
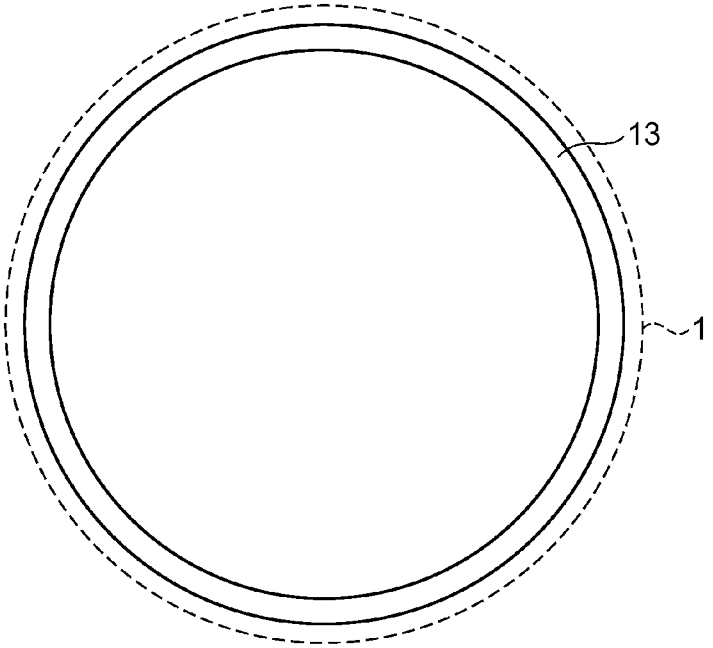
FIG. 7 is a plan view schematically illustrating the shape of an adhesive tape according to a further modified example.

According to the embodiment, the width of the adhesive tape in the plan view is the same as the width of the first support member 1. However, the adhesive tape may have a smaller width than that of the first support member 1. FIG. 7 is a plan view schematically illustrating the shape of this adhesive tape.

As illustrated in FIG. 7, a ring-shaped adhesive tape 13 has a width smaller than the width of the first support member 1. A broken line in the figure shows the external shape of the first support member 1 in the embodiment. When the width of the adhesive tape 13 is smaller than the width of the first support member 1, the adhering area between the adhesive tape 13 and the first support member 1 decreases. Thus, separation between the first support member 1 and the substrate 2 becomes easier.

Modified Example 4

Figure 8:
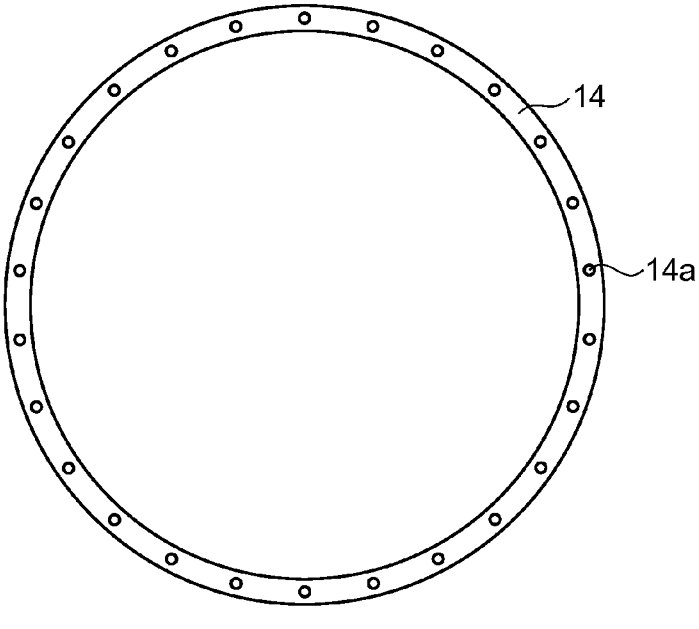
FIG. 8 is a plan view schematically illustrating the shape of an adhesive tape according to a still further modified example.

The ring-shaped adhesive tape according to the embodiment may have additional holes. Explained below are the details of the shape of this adhesive tape used for affixation of the first support member 1. FIG. 8 is a plan view schematically illustrating the shape of the adhesive tape in this example.

As illustrated in FIG. 8, a ring-shaped adhesive tape 14 has a plurality of holes in the area between the outer periphery and the inner periphery thereof. When the ring-shaped adhesive tape 14 has holes 14*a*, the adhering area decreases. Thus, separation between the first support member 1 and the substrate 2 becomes easier.

The entire disclosure of Japanese Patent Application No. 2011-013751, filed Jan. 26, 2011 is expressly incorporated by reference herein.

What is claimed is:

1. A processing method of a substrate comprising:

a first bonding step which bonds a first support member to a first surface of the substrate such that the first support member covers the first surface of the substrate;

a first processing step which performs a first treatment on a second surface of the substrate, the second surface being opposite to the first surface;

a first separating step which separates the first support member from the substrate;

a second bonding step which bonds a ring-shaped second support member to the first surface of the substrate along an outer periphery of the substrate after the first support member is separated from the substrate;

a second processing step which performs a second treatment on the first and second surfaces of the substrate; and a second separating step which separates the ring-shaped second support member from the substrate.

2. The processing method of the substrate according to claim 1, wherein the ring-shaped second support member has light transmissibility, and the first support member and the ring-shaped second support member are bonded to the substrate via an adhesive or an adhesive tape releasable by irradiation of UV light or releasable by heating in the first and second bonding steps, respectively.

3. The processing method of the substrate according to claim 2, wherein the adhesive and the adhesive tape have heat resistance; and the adhesive and the adhesive tape releasable by heating have heat resistance up to a releasable temperature.

4. The processing method of the substrate according to claim 3, wherein the second processing step includes a step for simultaneously processing both the first surface and the second surface.

5. The processing method of the substrate according to claim 1, wherein the second separating step shifts the ring-shaped second support member in a direction perpendicular to the substrate after irradiation of UV light or after heating to separate the ring-shaped second support member from the substrate.

6. The processing method of the substrate according to claim 1, wherein after the first support member is separated from the first surface of the substrate, the ring-shaped second support member is bonded to the first surface of the substrate without another intervening step for bonding another support member to the first surface of the substrate.

7. The processing method of the substrate according to claim 2, wherein after the first support member is separated from the first surface of the substrate, the ring-shaped second support member is directly bonded to the first surface of the substrate via one of the adhesive and the adhesive tape without another intervening step for bonding another support member to the first surface of the substrate.

* * * * *